United States Patent [19]

Inoue et al.

[11] Patent Number: 4,641,195
[45] Date of Patent: Feb. 3, 1987

[54] SCANNING SPEED MODULATING APPARATUS FOR TELEVISION RECEIVER

[75] Inventors: Fumio Inoue, Yokohama; Masahiro Eto, Fujisawa; Shoei Shimaoka, Yokohama; Noboru Sakai, Fujisawa, all of Japan

[73] Assignee: Hitachi, Ltd., Tokyo, Japan

[21] Appl. No.: 724,832

[22] Filed: Apr. 19, 1985

[30] Foreign Application Priority Data

Apr. 20, 1984 [JP] Japan .................. 59-78429

[51] Int. Cl.$^4$ .............................................. H04N 5/68
[52] U.S. Cl. .................................................. 358/242
[58] Field of Search ............. 358/242, 64, 65, 37, 358/166, 243; 315/391, 394, 395; 340/730, 736

[56] References Cited

U.S. PATENT DOCUMENTS

| 3,830,958 | 8/1974 | Fuse | 358/242 |
| 3,936,872 | 2/1976 | Miyaoka | 358/64 |
| 3,980,819 | 9/1976 | Schwartz | 358/242 |
| 4,080,628 | 3/1978 | Jirka | 358/166 |
| 4,170,785 | 10/1979 | Yoshida | 358/242 |
| 4,183,064 | 1/1980 | Sahara | 358/242 |
| 4,185,301 | 1/1980 | Mitsuda | 358/242 |

FOREIGN PATENT DOCUMENTS 13064 3/1981 Japan .

OTHER PUBLICATIONS

A New Trinitron Color TV with Beam-Scan Velocity Modulation, by Y. Fuse, et al., IEEE Transactions on Consumer Electronics, Feb. 1976, pp. 13-21.

Primary Examiner—Tommy P. Chin
Attorney, Agent, or Firm—Antonelli, Terry & Wands

[57] ABSTRACT

A scanning speed modulating apparatus for a television receiver. A differentiated signal derived by differentiating a video signal is supplied to a horizontal deflecting coil, so that a current having a waveform corresponding to that of the differentiated signal and superposed on a horizontal deflecting signal flows through the horizontal deflecting coil.

14 Claims, 13 Drawing Figures

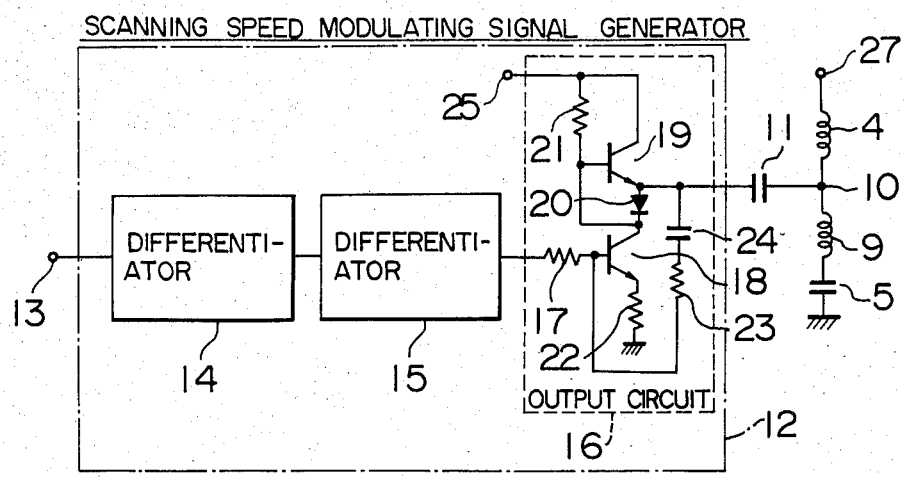
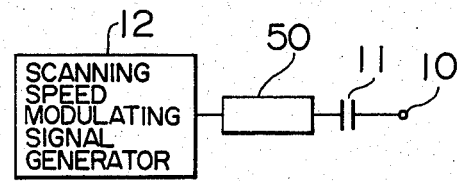
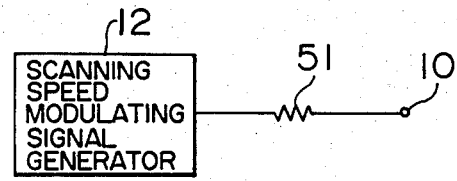
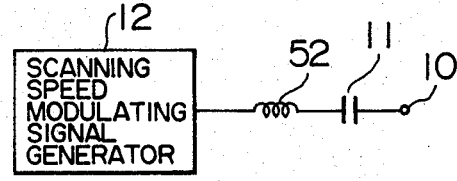

SCANNING SPEED MODULATING APPARATUS FOR TELEVISION RECEIVER

BACKGROUND OF THE INVENTION

1. Field of the Invention

The present invention generally relates to a scanning speed modulating circuit for a television receiver. More particularly, the invention concerns a scanning speed modulating circuit for enhancing sharpness of a picture or image produced by a television receiver through modulation of the horizontal scanning speed of an electron beam.

2. Description of the Prior Art

As a system for enhancing sharpness of a picture image produced by a television receiver, a so-called aperture correction scheme is most commonly adopted in which contour portions of a picture or image are emphasized by making use of preshoot and overshoot. However, because the maximum beam current is increased at the contour of the picture in the case of the aperture correction scheme, spot diameter of the electron beam is increased with the width of the shoots being correspondingly enlarged resulting thus in slow or gentle change in brightness.

As another method of improving the sharpness of picture, there has been known a method of controlling the scanning speed of the electron beam of the television receiver in accordance with a video signal component. This known method will briefly reviewed below by referring to FIGS. 1A to 1D of the accompanying drawings.

FIG. 1A shows a pulse-like waveform as an example of a luminance signal. By differentiating this waveform by a differentiating circuit, there can be obtained a waveform illustrated in FIG. 1B. By utilizing this differentiated signal, the scanning speed of the electron beam in a CRT (cathode-ray tube) or Braun tube is modulated in a manner illustrated in FIG. 1C. As the result, brightness is decreased in an earlier half of the rise-up edge of the luminance signal because of a increased scanning speed, while in a later half of the rise-up edge of the luminance signal, brightness is increased because of the correspondingly decreased scanning speed. Similar phenomenon or effect takes place in relation to the falling edge of the luminance signal. Consequently, contour of a picture produced on the CRT screen is emphasized in a manner illustrated in FIG. 1D, whereby a picture whose sharpness is enhanced in appearance can be obtained.

As a practical method of modulating the horizontal scanning speed, it is known that an auxiliarly deflecting coil for modulating the scanning speed is provided at a neck portion of the CRT in addition to an ordinary deflecting coil system, wherein the differentiated signal current shown in FIG. 1B is caused to flow through the auxiliary deflecting coil (reference may be made to, for example, Japanese Patent Application Laid-Open No. 13064/1981).

The modulating method in which the auxiliary deflecting coil is employed, however, has drawbacks mentioned below.

First, the auxiliary deflecting coil is expensive. Second, when the auxiliary deflecting coil is to be mounted as a separate unit in addition to the ordinary deflecting coil system, a delicate and precise adjustment of the angle at which the auxiliary coil is mounted is required. Besides, since the auxiliary coil is positioned as superposed on an electron gun, a focussing electric field of an electrostatic focussing lens is disturbed to exert adverse influence to the electron beam focussing performance with the result that astigmatism is likely to make appearance, to a serious disadvantage. In order to improve the sharpness, it is necessary that the beam spot is maintained in a small diameter. If the spot diameter is increased, there may arise a possibility that the intended purpose can not be attained. Furthermore, inductance of both the ordinary deflecting coil and the auxiliary deflecting coil will bring about various disturbances due to mutual interference of these coils, giving rise to, for example, problems that the sensitivity of the ordinary deflecting coil is degraded and misconvergence is undesirably produced.

As another practical method of modulating the horizontal scanning speed, it is known that a focussing electrode which the electron beam crosses at a single point within the electron gun is divided into two portions along a plane inclined relative to the center axis, wherein a scanning speed modulating signal is applied across the divided electrodes to thereby deflecting electrostatically the electron beam in the horizontal direction (reference may be made to, for example, IEEE Transactions on Consumer, February 1976, Vol. CE-22, No. 1, p.p. 13-21).

Although the above method can be applied to a one-gun type Braun tube such as a black and white CRT, trinitron type CRT or the like in which a single electron gun is used, a great difficulty will be encountered in adopting this method in a shadow-mask type color CRT in which three electron guns are employed, because of the great distance existing among the electron beams.

The method mentioned above can be applied to the CRT in which the single electron gun is used and the electron beam is concentrated at a single point within the electron gun. However, in view of the facts that the scanning speed modulating signal has to be applied to the focussing electrode to which a high voltage is applied, that restricting conditions are imposed on the design of the focussing electrode and that the focussing voltage is subjected to the influence of modulation of the electron beam scanning speed, it is difficult to realize the modulation of the scanning speed in the optimum spot state while maintaining the focussing voltage at an optimum level.

SUMMARY OF THE INVENTION

It is an object of the present invention to provide a scanning speed modulating circuit or apparatus in which the drawbacks of the prior art systems are eliminated and which can be applied to any type of CRT for the purpose of enhancing or improving sharpness of picture produced by a television receiver.

In view of the above and other objects which will be more apparent as description proceeds, it is proposed according to an aspect of the invention that a scanning speed modulating current is superposed on a deflecting current flowing through a horizontal deflecting coil to thereby vary the deflecting magnetic field, without resorting to the use of a complicated structure of the focussing electrode and the auxiliary deflecting coil.

In this connection, it is noted that both ends of the horizontal deflecting coil are at low impedance when a horizontal output transistor or damper diode is conducting. Accordingly, the superposed scanning speed modulating current is difficult to flow when the scanning speed modulating voltage is simply applied to either one of the ends of the horizontal deflecting coil.

Accordingly, in a preferred embodiment of the invention, an inductance element is connected in series to the horizontal deflecting coil, wherein the scanning speed modulating signal is applied to a junction between the horizontal deflecting coil and the inductance element by way of an impedance element.

According to another embodiment of the invention, a secondary winding of a transformer is connected in series to the horizontal deflecting coil, wherein the scanning speed modulating signal is applied to the primary winding of the transformer.

BRIEF DESCRIPTION OF THE DRAWINGS

FIG. 4 is a circuit diagram showing in detail a circuit configuration of a scanning speed modulating signal generator according to an embodiment of the invention;

FIGS. 5A to 5C are circuit diagrams showing partial versions of the circuit according to the invention;

DESCRIPTION OF THE PREFERRED EMBODIMENTS

The principle of the scanning speed modulating circuit for a television (TV) receiver according to the invention resides in that a scanning speed modulating signal is superposed on a horizontal deflection signal in the case of a conventional TV receiver of horizontal scanning type, as described hereinbefore in conjunction with FIGS. 1A to 1D. For having a better understanding of the present invention, description will first be made on a horizontal deflecting output circuit employed in a conventional TV receiver by referring to FIG. 2, before entering into description of the exemplary embodiments of the invention.

Figure 1A:
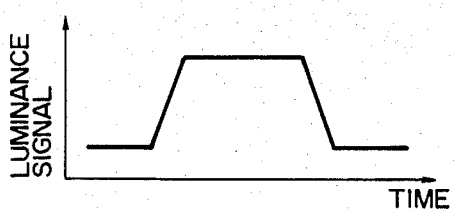
FIGS. 1A to FIG. 1D are waveform diagrams for illustrating the principle of contour correction or sharpness enhancement of a picture or image produced by a TV receiver through modulation of scanning speed of an electron beam.
Figure 1B:
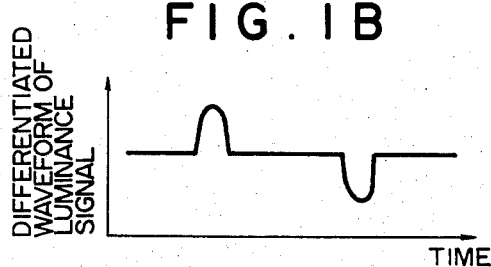
Figure 1C:
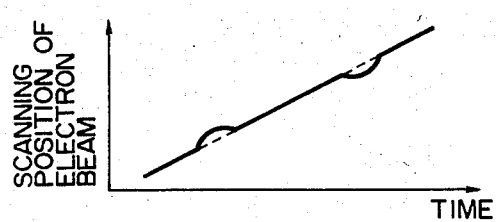
Figure 1D:
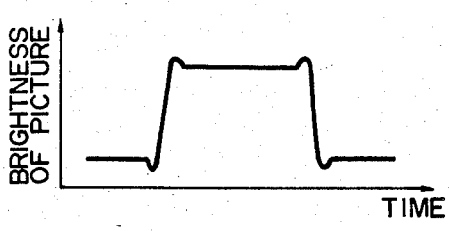
Figure 2:
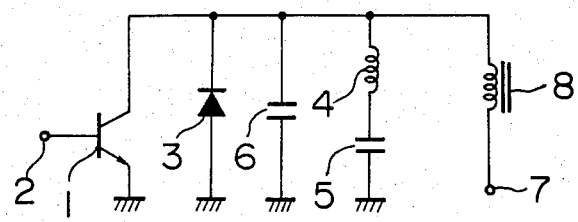
FIG. 2 is a circuit diagram showing a conventional horizontal output circuit.

In FIG. 2, a reference numeral 1 denotes a horizontal output transistor which is made conductive in response to a driving signal applied to a terminal 2 primarily during a later half of a scanning period. A numeral 3 denotes a damper diode which is turned on (i.e. made conductive) during an earlier half of the scanning period during which the transistor 1 is non-conductive. Currents flowing through the transistors 1 and the diode 3 form, respectively, current loops through a horizontal deflecting coil 4 and an S-character correcting capacitor 5. A reference numeral 6 denotes a capacitor which is commonly referred to as a resonance capacitor and serves for regenerating energy stored in the deflecting coil 4 through resonance during a flyback period in which both the transistor 1 and the diode 3 are in the non-conducting state. The horizontal output circuit is supplementarily supplied with energy from a terminal 7 through choke inductance of a flyback transformer 8.

Figure 3A:
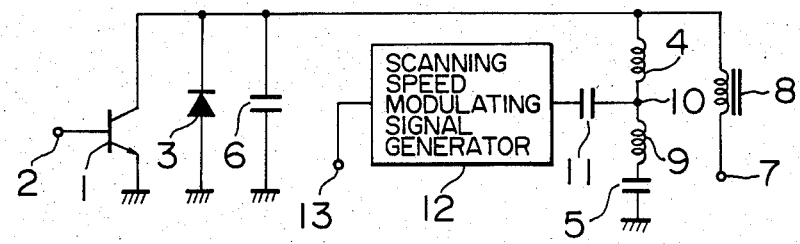
FIGS. 3A and 3B are circuit diagram showing horizontal output circuits according to first embodiment of the present invention, respectively.

Now, means for applying a scanning speed modulating signal according to the invention will be described in concrete by referring to FIGS. 3A to 7. FIG. 3A is a view showing a circuit configuration according to a first embodiment of the present invention, in which like parts as those shown in FIG. 2 are denoted by the same reference symbols. Referring to FIG. 3A, a coil 9 (inductance element or inductor) is connected in series to the horizontal deflecting coil 4, wherein a junction 10 between the coils 4 and 9 is connected to a scanning speed modulating signal generator circuit 12 through a capacitor 11 (impedance element). The video signal is applied to a terminal 13.

With the illustrated circuit arrangement, impedance at the junction 10 is increased due to the insertion of the coil 9, whereby the magnitude of the current which is supplied from the scanning speed modulating signal generator circuit 12 and flows through the horizontal deflecting coil 4 depends on the impedance ratio between the coils 4 and 9. As the consequence, an electron beam is deflected by the current on which the scanning speed modulating signal is superposed, resulting in that the scanning speed of the electron beam is so modulated as to be increased on the low brightness side of a picture contour while decreased on the high brightness side of the contour, whereby the sharpness of the produced picture or image is enhanced.

Figure 3B:
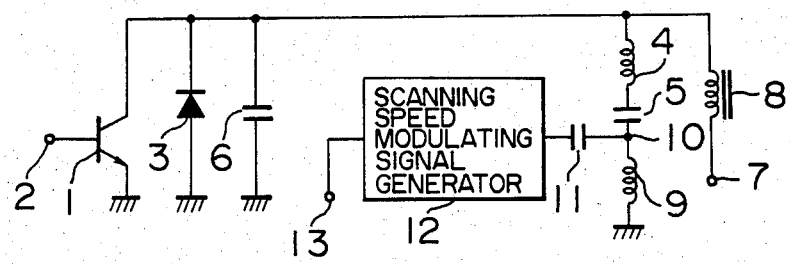

FIG. 3B shows a version of the circuit configuration shown in FIG. 3A which differs from the preceding embodiment (FIG. 3A) in that the coil 9 is inserted between the S-character correcting capacitor 5 and the ground. The circuit shown in FIG. 3B operates in the manner similar to that shown in FIG. 3A to the similar effect. In the case of the circuit shown in FIG. 3B, the scanning speed modulating signal generator circuit 12 may be alternatively connected to a junction between the horizontal deflecting coil 4 and the capacitor 5 in place of the illustrated junction 10.

Further, in the circuits shown in FIGS. 3A and 3B, the connecting positions or dispositions of the horizontal deflecting coil 4 and the coil 9 may be reversed to the similar effect. In that case, the polarity of the scanning speed modulating signal has to be inverted.

Next, an output circuitry of the scanning speed modulating signal generator circuit 12 according to a first embodiment will be described in detail by referring to FIG. 4.

In FIG. 4, a video signal applied to a terminal 13 is differentiated twice by differentiating circuits 14 and 15, respectively, and subsequently supplied to an output circuitry 16 of the scanning speed modulating signal generator 12. It should be mentioned that a buffer circuit, amplifier, delay element for controlling position at which the correction is to be made and other conventional circuit elements are omitted from illustration in FIG. 4. The reason why the video signal is differentiated twice is explained by the fact that when the horizontal deflecting coil 4 and the coil or inductance element 9 are driven by the output circuitry 16, the current flowing through the horizontal deflecting coil 4 is integrated. The output circuitry 16 is implemented in a SRPP (Shunt Regulated Push-Pull) configuration. More specifically, the output circuitry 16 is composed of a resistor 17, transistors 18 and 19, a diode 20, resistors 21, 22 and 23, and a capacitor 24 connected in the manner illustrated. As the class B push-pull output circuit, a SEPP (Single Ended Push-Pull) circuit may be alternatively employed. However, the SRPP circuit is advantageous over the SEPP circuit in that the number of transistors as required is small and that the circuit can be implemented with only the transistors of a same polarity. The resistor 23 and the capacitor 24 constitute a feedback loop for serving to correct distortion of the signal waveform outputted from the SRPP circuitry. The resistor 17 is inserted for assuring an adequate feedback. A reference numeral 25 denotes a voltage source terminal.

The output circuitry 16 has an output terminal which is connected through a capacitor 11 to a junction 10 between the horizontal deflecting coil 4 and the inductance element 9 which is connected in series to the coil 4. A terminal 27 represents a junction between the horizontal output transistor 1 (refer to FIG. 1) and the horizontal deflecting coil 4. As will be appreciated from the description of the arrangement and operation of the horizontal output cirduit shown in FIG. 2, either the output transistor 1 or the damper diode 3 is conductive during the scanning period. Accordingly, impedance of the output transistor 1 or the damper diode 3 at the frequency of the scanning speed modulating signal resulted from differentiation of the video signal is considerably low as compared with that of the horizontal deflecting coil 4, while at the junction between the deflecting coil 4 and the S-character correcting capacitor 5, impedance of the S-character correcting capacitor 5 is far lower than that of the deflecting coil 4. Consequently, it is impossible to cause the scanning speed modulating current of sufficient magnitude to flow through the horizontal deflecting coil 4 if the scanning speed modulating signal is applied to the junction between the horizontal deflecting coil 4 and the S-character correcting capacitor 5 in the case of the circuit shown in FIG. 2, rendering it impracticable to enhance the sharpness of produced image or picture. In contrast, by connecting the inductance element 9 in series to the horizontal deflecting coil 4 as shown in FIG. 4, the inductance element 9 can exhibit relatively high impedance at the frequency of the scanning speed modulating signal, whereby the scanning speed modulating current of sufficient magnitude is allowed to flow through the horizontal deflecting coil 4, whereby the image sharpness can be enhanced as desired. The inductance element 9 should preferably have an inductance value in a range of ca. 1/50 to ca. ⅓ of that of the horizontal deflecting coil 4 in consideration of the ratio at which the scanning speed modulating signal current is shunted to the horizontal deflecting coil 4 as well as sensitivity of the ordinary horizontal deflecting circuit. In case the horizontal linearity correcting coil is employed in the horizontal output circuit to which the invention is applied, the horizontal linearity correcting coil may be used in place of the inductance element 9. The invention teaches that the capacity or value of the capacitor 11 be restricted. In the SRPP or SEPP type output circuit which is employed in an audio output circuit and a vertical output circuit, it is common that the value of a capacitor which is to be employed as the capacitor 11 is selected as large possible by taking into consideration other factors such as configuration, cost and the like. However, in the case of the output circuitry according to the invention, because a flyback pulse having an amplitude determined in dependence on the division ratio of impedance between the horizontal deflecting coil 4 and the inductance element 9 is produced at the junction therebetween, there may occur damages or destruction or abnormal operation of the output circuit under the influence of the flyback pulse, when the value of the capacitor 11 is selected large. Thus, the capacity or value of the capacitor 11 should be as small as possible. More specifically, it is desirable that the capacitor 11 is to be selected to have a proper value in consideration of the desired operation of the circuit to which the invention is applied as well as the aimed enhancement of the image shapness. In particular, the time constant $\tau = \sqrt{LC}$ (where L represents parallel inductance value of the horizontal deflecting coil 4 and the inductance element 9 and C represents the capacity of the capacitor 11) should satisfy the relation:

$$\tau \leq \frac{1}{2\pi \times 3f_H} \quad (1)$$

where $f_H$ represents the horizontal deflection frequency. The reason can be explained as follows. The flyback time of the horizontal deflecting signal is generally about one-sixth (1/6) of the period or duration H of the horizontal deflecting signal. Referring to FIG. 2, this flyback time corresponds to a half-period of a resonance waveform which in turn is determined on the basis of inductance of the horizontal deflecting coil 4 and the resonance capacitor 6. Accordingly, the resonance waveform has a period corresponding to H/3 and a frequency which corresponds to $3f_H$ where $f_H$ represents the horizontal deflection frequency. Accordingly, when the time constant $\tau$ is selected so as to meet the condition difined above, the influence of the flyback pulse to the output circuitry 16 can be substantially suppressed.

Additionally, because the scanning speed modulating signal is required to be supplied to the horizontal deflecting coil 4 at a sufficiently high level, the capacity C of the capacitor 11 should satisfy the following condition:

$$\tau \geq \frac{1}{2\pi \times 5f_v} \quad (2)$$

where $f_v$ represents the frequency of the scanning speed modulating signal. In the above expression (2), the factor of "5" is selected to assure an appropriate margin.

Now, a manner in which the frequency of the scanning speed modulating signal is determined will be elucidated. The luminance signal of NTSC color television has a frequency band of zero to 4.2 MHz, wherein frequency components lower than hundreds KHz contribute to the contrast of the produced image while frequency components higher than 1 MHz contribute to sharpness and/or fineness of the image, i.e. display of fine patterns. In general, the frequency in the range of 1 to 3 MHz contributes to the aimed enhancement of sharpness to make clearer the contour of image. Accordingly, the frequency of the scanning speed modulating signal is generally selected from the frequency range of 1 to 3 MHz in consideration of a taste of buyers and an idea of designer.

It should be here added that when the capacitor 11 is of a very large value so that the time constant $\tau$ is outside of the range defined by the expression (1) and (2), then another impedance element 50, e.g. a resistor, may be connected in series to the capacitor 11, as shown in FIG. 5A, so that the time constant $$\tau\sqrt{\frac{L}{R}}$$

(where L represents the parallel inductance value of the horizontal deflecting coil 4 and the inductor 9 and R represents the resistance value of the impedance element 50) lies approximately within the range delimited by the above expressions (1) and (2). In this connection, it should further be noted that when a difference voltage between the average DC voltage appearing at both ends of the capacitor 11 is relatively small and when the average DC current value determined by the difference voltage and the resistance value R involves no abnormality in the operations of the output circuitry 16 and the horizontal output circuit, the capacitor 11 may be eliminated, wherein the output circuitry 16 and the horizontal output circuit can be connected to each other only through a resistor 51, as shown in FIG. 5B.

Alternatively, an inductance element or inductor 52 may be inserted in series to the capacitor 11 for the purpose of absorbing the influence of the horizontal flyback pulse, as shown in FIG. 5C.

Figure 6:
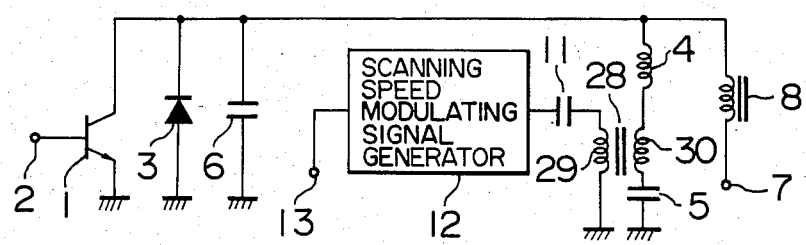
FIG. 6 is a circuit diagram showing another embodiment of the invention.

FIG. 6 shows a second embodiment of the invention, in which same element as those shown in FIG. 3A are denoted by same reference numerals. According to the second embodiment, the inductor 9 connected in series to the horizontal deflecting coil 4 in the case of the first embodiment is replaced by a secondary winding 30 of a transformer 28 which winding is connected in series to the horizontal deflecting coil 4, while the primary winding 29 of the transformer 28 is connected to the scanning speed modulating signal generator circuit 12.

With this circuit arrangement, the horizontal deflecting current flowing through the secondary winding 30 of the transformer 28 is superposed with the current flowing through the primary winding 29 and corresponding to the scanning speed modulating signal. Thus, the electron beam is finely controlled by the scanning speed modulating current, whereby the sharpness enhancing effect can be attained.

In connection with the second embodiment, it goes without saying that similar enhancement effect can be accomplished even when the horizontal deflecting coil 4, the transformer 28 and the S-character correcting capacitor 5 are changed in the connecting order. Further, it is noted that when the transmission or transfer characteristic existing between the primary and secondary windings of the transformer 28 is so selected as to present a sufficiently large impedance to the flyback pulse of a low frequency while exhibiting a small impedance to the scanning speed modulating frequency, the capacitor 11 for protecting the scanning speed modulating signal generator circuit 12 from damage due to the flyback pulse can be spared. Otherwise, the capacitor 11 has to be connected in the manner shown in FIG. 6.

In the case of the second embodiment, all the current induced in the secondary winding 30 of the transformer 28 in response to the output of the scanning speed modulating signal generator 12 can flow through the horizontal deflecting coil 4, whereby the decreasing of the horizontal deflecting coil current by the amount of the current flowing to the coil 9 in the case of the first embodiment is cancelled, to an additional advantage.

Figure 7:
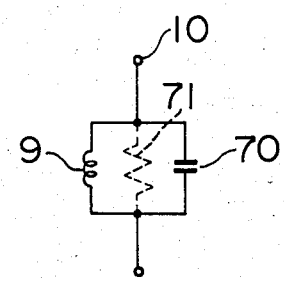
FIG. 7 is a circuit daigram showing a partial modification of the circuit according to the invention.

In the case of the first embodiment desdribed hereinbefore, it is possible to connect a capacitor 70 in parallel with the inductor 9 to constitute a parallel resonance circuit, as shown in FIG. 7, wherein the resonance frequency of the parallel resonance circuit is made to coincide with the output frequency of the scanning speed modulating signal generator, to thereby enhance the effect or action of the impedance element 9. In that case, impedance of the resonance circuit becomes infinite for the frequency of the scanning speed modulating signal, as the result of which all the scanning speed modulating signal current is forced to flow through the horizontal deflecting coil 4, involving an improved efficiency. In FIG. 7, a numeral 71 denotes a damping resistor for enlarging the bandwidth of the scanning speed modulating signal. The damping resistor 70 may be alternatively connected in series to the capacitor 70.

As will be appreciated from the foregoing description, it is possible according to the teachings of the invention to perform the modulation of the scanning speed of electron beam without using any auxiliary deflecting coil with the focussing electrode being left in fact. Thus, sharpness of produced image or picture can be enhanced a in much simplified and inexpensive manner without being accompanied by the need for delicate and precise adjustment of the mounting angle of the auxiliary coil as in the case of the system where the auxiliary deflecting coil is employed or adverse influence to the electron beam focussing characteristics and degradation in the sensitivity of the vertical deflecting coil. Further, absence of the auxiliary coil means a corresponding reduction in the manufacturing cost.

We claim:

1. A scanning speed modulating apparatus for a television receiver, comprising:
a horizontal deflecting coil supplied with a horizontal deflecting signal from a horizontal deflecting circuit for deflecting horizontally an electron beam;
a differentiator circuit for differentiating a waveform of a video signal; and
a scanning speed modulating signal supply circuit for amplifying an output signal from said differentiator circuit to a requisite level to supply a current having a waveform corresponding to the differentiated waveform of said video signal to said horizontal deflecting coil, to thereby enhance the sharpness of an image produced by said television receiver, said scanning speed modulating signal supply circuit including an inductance element connected in series to said horizontal deflecting coil, an impedance element connected to a junction between said horizontal deflecting coil and said inductance element, and a scanning speed modulating signal output circuit for supplying a scanning speed modulating signal to said junction through said impedance element.

2. A scanning speed modulating apparatus for a television receiver according to claim 1, wherein said differentiator circuit includes means for twice differentiating said video signal.

3. A scanning speed modulating apparatus for a television receiver according to claim 1, further including a capacitor connected in parallel with said inductance element to constitute a parallel resonance circuit which resonates to the frequency of said scanning speed modulating signal.

4. A scanning speed modulating apparatus for a television receiver according to claim 3, wherein said parallel resonance circuit includes a damping resistor connected for enlarging a bandwidth around the resonance frequency.

5. A scanning speed modulating apparatus for a television receiver according to claim 1, wherein said impedance element is constituted by a capacitor.

6. A scanning speed modulating apparatus for a television receiver according to claim 1, wherein said impedance element is constituted by a series connection of a capacitor and an impedance element.

7. A scanning speed modulating apparatus for a television receiver according to claim 1, wherein said impedance element is constituted by a resistor.

8. A scanning speed modulating apparatus for a television receiver according to claim 1, wherein said impedance element is constituted by a series connection of a capacitor and an inductance element.

9. A scanning speed modulating apparatus for a television receiver according to claim 1, wherein said scanning speed modulating signal output circuit includes a shunt regulated push-pull circuit.

10. A scanning speed modulating apparatus for a television receiver according to claim 1, wherein impedance value of said impedance element is determined so that a time constant $\tau$ determined by parallel impedance of said horizontal deflecting coil and said inductance element and impedance of said impedance element satisfies the following condition:

$$\frac{1}{2\pi \times 5f_v} \leq \tau \leq \frac{1}{2\pi \times 3f_H}$$

where $f_v$ represents the frequency of said scanning speed modulating signal and $f_h$ represents the horizontal deflection frequency.

11. A scanning speed modulating apparatus for a television receiver according to claim 1, said impedance element being constituted by a capacitor, wherein a value L of said inductance element and a value C of said capacitor are selected in relation to the inductance value $L_H$ of said horizontal deflecting coil so that two following conditions are satisfied:

$$\frac{L_H}{50} \leq L \leq \frac{L_H}{3},$$

and $$\frac{1}{2\pi \times 5f_v} \leq \sqrt{\frac{L \cdot L_H}{L + L_H} \cdot C} \leq \frac{1}{2\pi \times 3f_H}$$

where $f_v$ represents the frequency of said scanning speed modulating signal and $f_H$ represents the horizontal deflection frequency.

12. A scanning speed modulating apparatus for a television receiver, comprising:
a horizontal deflecting coil supplied with a horizontal deflecting signal from a horizontal deflecting circuit for deflecting horizontally an electron beam;
a defferentiator circuit for differentiating a waveform of a video signal; and
a scanning speed modulating signal supply circuit for amplifying an output signal from said differentiator circuit to a requisite level to supply a current having a waveform corresponding to the differentiated waveform of said video signal to said horizontal deflecting coil, to thereby enhance the sharpness of an image produced by said television receiver, said scanning speed modulating signal supply circuit including a scanning speed modulating signal output circuit and a transformer coupling circuit connected so as to supply the scanning speed modulating signal from said output circuit to said horizontal deflecting circuit.

13. A scanning speed modulating apparatus for a television receiver according to claim 12, wherein said transformer coupling circuit includes a- transformer having a primary winding connected to said scanning speed modulating signal output circuit and a secondary winding connected in series to said horizontal deflecting coil.

14. A scanning speed modulating apparatus for a television receiver according to claim 13, wherein said transformer coupling circuit further includes a capacitor connected between said scanning speed modulating signal output circuit and the primary winding of said transformer.

* * * * *